April 30, 1957          W. BENNETT          2,790,517
MULTIPLE TYPE WHEEL BRAKE
Original Filed Dec. 8, 1947          2 Sheets-Sheet 1
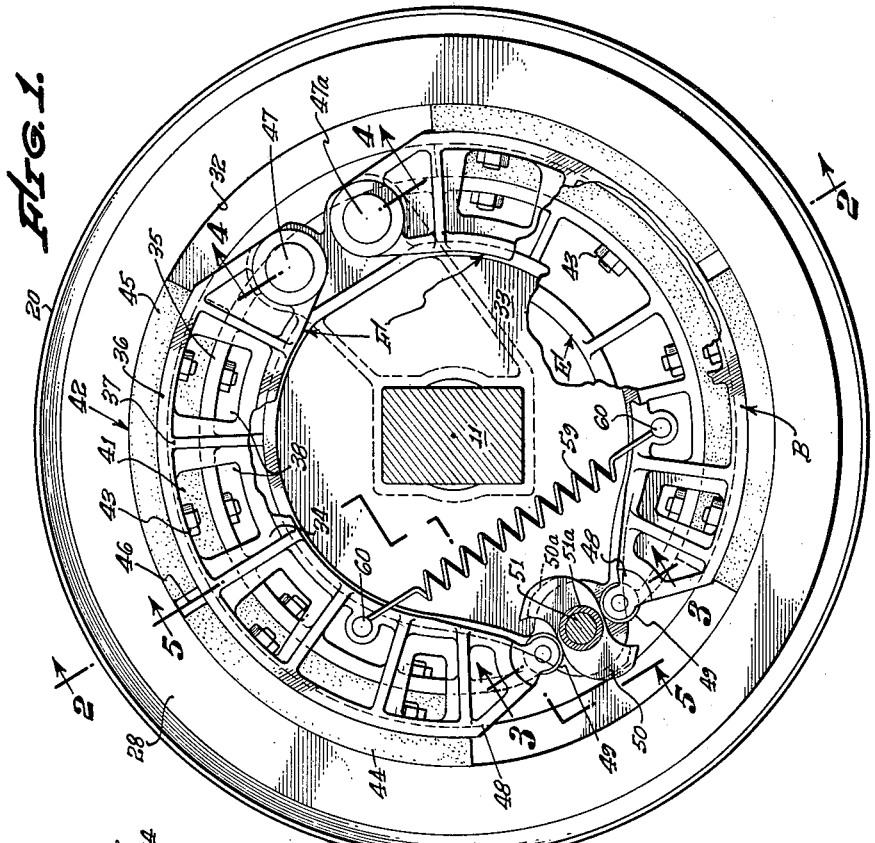
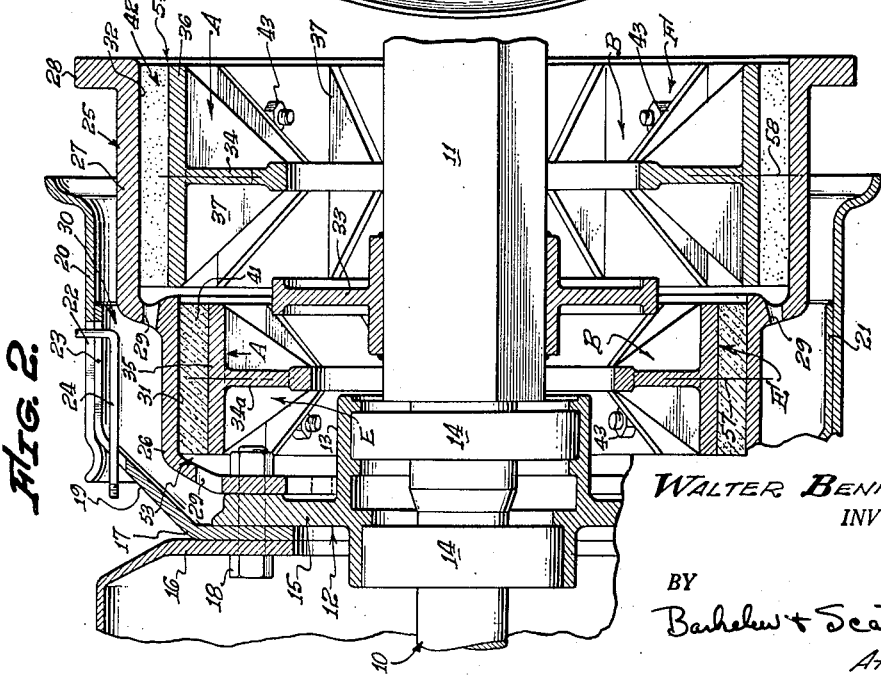
WALTER BENNETT,
INVENTOR.
BY
Barthelew + Scanlberry
ATTORNEYS.

April 30, 1957   W. BENNETT   2,790,517
MULTIPLE TYPE WHEEL BRAKE
Original Filed Dec. 8, 1947   2 Sheets-Sheet 2
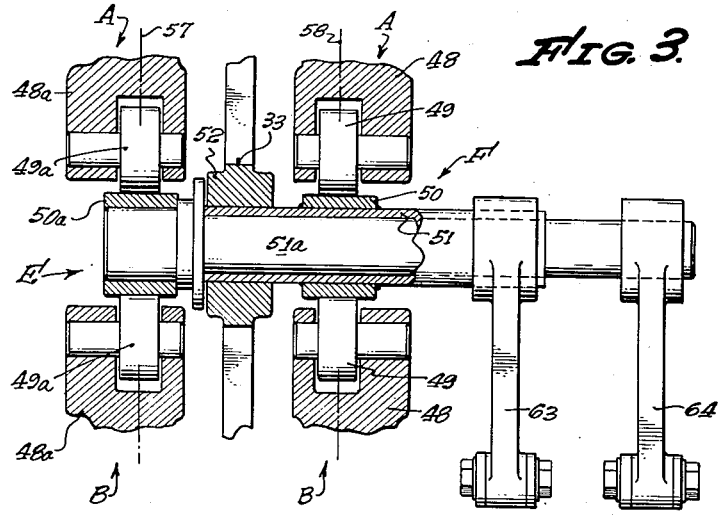
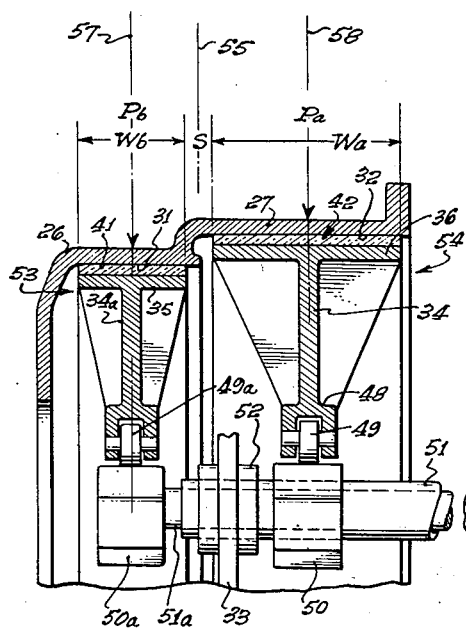
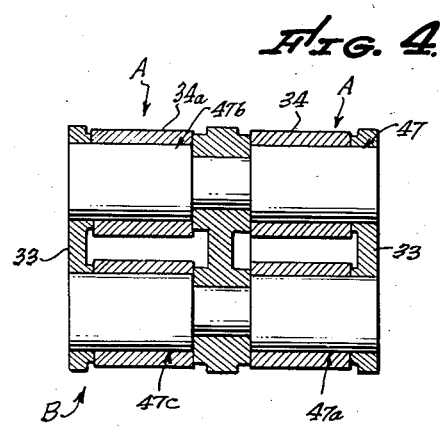
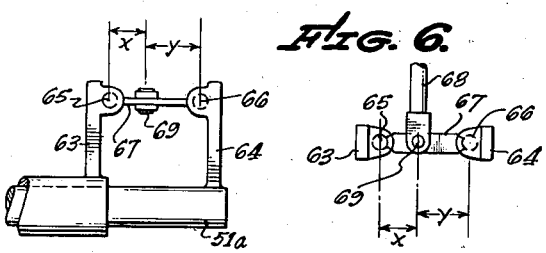
WALTER BENNETT,
INVENTOR.
BY
Bartholow & Scantlebury
ATTORNEYS.

United States Patent Office 2,790,517
Patented Apr. 30, 1957

2,790,517

MULTIPLE TYPE WHEEL BRAKE

Walter Bennett, Los Angeles, Calif., assignor to Utility Trailer Manufacturing Company, Los Angeles, Calif., a corporation of California Original application December 8, 1947, Serial No. 790,327, now Patent No. 2,682,319, dated June 29, 1954. Divided and this application June 23, 1954, Serial No. 438,662

5 Claims. (Cl. 188—79)

This invention relates generally to vehicle brakes and is more particularly concerned with dual brakes of the type wherein a plurality of brake shoes are simultaneously applied to a brake drum at side-by-side zones.

The present application is a division of my copending application entitled Brake, filed December 8, 1947, Serial No. 790,327, to issue June 29, 1954 under No. 2,682,319.

Though not at all limited thereto, the invention is particularly well adapted to the brakes of heavy duty trailers of the dual wheel variety, that is, where the wheels are arranged side-by-side in pairs with the two wheels of each pair mounted on a single, axle-supported member.

As pointed out in the parent application, there has been continuous effort to increase the effective braking surface of such installations, but the limitations are decidedly severe. Increase of drum diameters and/or widths is not only limited by space considerations but is practically prohibitive because of the difficult problems of application and wear-characteristics which it creates, as is well recognized by those working in the art.

In one type of dual-wheel construction, the inner wheel of a given pair carries a deep-belled drum. The conical bell-portion of the drum is of relative reduced-diameter and lies wholly within the rim of the inner wheel. The annular skirt of the drum is of larger diameter and extends axially inward beyond the rim. It is upon this skirt portion that the usual brake drum surface is formed. The extent of brake-drum surface permissible to such a skirt is definitely limited by structural characteristics of the running gear and by brake shoe problems, both as to application and as to wear.

As a means for providing additional brake surface in spite of the above inherent difficulties, I have utilized the bell-portion of the drum, a portion which has heretofore been used only to support the usual skirt or flange portion at a position sufficiently inward toward the center of the chassis to enable maximum allowable diameter to the braking surface and to enable easy installation and operation of the applying mechanism.

To this end I have made the bell-portion substantially cylindrical and have formed an internal brake-drum surface within that portion. I have then provided brake shoes (or, more generally, a "braking element" which may include a one-piece "band" as distinguished from a plurality of shoes) for this surface, the shoes being operatively connected to the applying mechanism which operates the brake shoes associated with the drum skirt, whereby all shoes are simultaneously appliable.

Thus, I have added very materially to the effective area of braking surface, with obvious great advantage and yet I have in no way created the problems incidental to an attempted increase in the diameter or width of the usual "skirt" drum.

Ordinarily, though not always, the available space within the bell-portion is such that the width of the braking surface therein is less than that of the braking surface of the skirt portion, with a corresponding difference in brake-shoe widths. With other factors being equal, or not materially affecting performance, the difference in brake shoe widths creates certain problems of brake-application. Similar problems are created even though the widths of the shoes be equal if there be differences in factors such as radiation capacities, coefficients of friction or relative angular extents of the shoes.

In the parent application, the claims are drawn to a solution of these problems which involves the provision of a rigid connection between the two shoes.

In the instant application, the claims are directed to a solution wherein such rigid connection is omitted, and, in its place, there are substituted separate shoe units actuated by separate cams and cam shafts, though the cams are operated simultaneously through an equalizing system which takes into account differences in the widths, etc., of the individual shoes. How this is accomplished can best be understood by reference to the following detailed description, wherein other objects and features of the invention are made apparent. Reference will be made to the accompanying drawings, in which:

Fig. 1 is a side elevation of a wheel equipped with an embodiment of my improved brake;

Fig. 2 is a section on line 2—2 of Fig. 1;

Fig. 3 is an enlarged fragmentary section on line 3—3 of Fig. 1;

Fig. 4 is an enlarged fragmentary section on line 4—4 of Fig. 1;

Fig. 5 is a schematic view showing conventionally certain elements of Figs. 1 and 2, but it may be considered broadly as corresponding to a section on line 5—5 of Fig. 1;

Fig. 6 is a detached, plan view of the equalizing connection shown in Fig. 5.

I have illustrated the brake in association with dual wheels such as are used on heavy duty trailers wherein the axles are "dead," but it is to be understood this is for illustrative purposes, only, and is not to be considered as limitative on the invention.

In Figs. 1 and 2 the wheel axle is shown at 10, the axle having a portion 11 of rectangular cross-section. The wheel, proper, 12, includes a hub-portion 13 mounted for rotation on axle 10 through usual bearings 14. Hub 13 has an annular flange 15 to which wheel-disks 16 and 17 are detachably secured by bolts 18. Disk 17 is cupped at 19, the time rim 20 being welded to the cup-flange 21. Cup 19 and rim 20 are slotted at 22 and 23, respectively, to receive the valve stem 24 of a tire (not shown) mounted on rim 20. Disk 16 is adapted to support a tire rim (not shown) similar to rim 20.

My improved brake-drum is indicated generally at 25 and comprises a cylindrical, open-ended bell-section 26 and a larger-diameter, skirt portion 27, the latter terminating in an external annular flange 28. Bell-portion 26 is detachably held to wheel flange 15 by bolts 18, and ventilation openings 29 are provided for the circulation of brake-cooling air. It is important, also, that the drum be appreciably spaced, as at 30, from valve-stem 24, so the heat generated during brake-application may not have harmful effect on the stem or tire. The stem, and the annular clearance necessarily maintained between it and the brake drum, limit the diameter of that portion of the brake drum which may be contained within the cup 19 of disk 17. The bell-portion 26 of the drum is entirely contained within the rim 20, while skirt portion 27 lies about half within and half without the rim.

The bell and skirt portions of the drum are internally machined to different diameters, thus providing stepped, concentric braking surfaces or zones 31 and 32, respectively of relatively small and relatively larger diameters, the two zones or steps being side by side but being relatively spaced in the direction of their common axis. Surface 32 is wider than 31, though this width-relationship is not to be considered as limitative.

Welded to the rectangular section 11 of axle 12, is a stationary, rigid carrier member or plate 33 for supporting two sets of shoe members, one set E for cooperation with braking surface 31, and the other set F for cooperation with braking surface 32. Thus, the shoes of set F are wider than are the shoes of set E. Each set E and F is made up of two shoe members generally indicated at A and B which are, in all essence, alike and operate in the same manner. Therefore only one member need be described in detail. It is to be understood, however, that the showing of segmental shoes A and B making up a single brake unit is not to be considered as limiting the invention against adaptation of the one-piece, band type of shoe.

Member A of set F is made up of an arcuate web or body portion 34 arranged centrally of arcuate flange 36, the latter being adapted to be taken within skirt-drum 27. Radial ribs 37 lend structural support to the flange, and body portion 34 is lightened by the provision of openings 38. Similarly, member A of set E is made up of an arcuate web or body portion 34a arranged centrally of arcuate flange 35 and is adapted to be taken within bell-drum 26. Brake linings 41 and 42 are replaceably secured to flanges 35 and 36, respectively, by studs 43, and are substantially complementary in curvature to brake-drum surfaces 31 and 32, respectively. Lining 42 may be made up of a plurality of sections 44, 45 spaced slightly apart as at 46, but the two sections will be considered, in the following analysis, as though they were continuous or were butted end-to-end, thus representing a lining 42 which is of slightly less effective angular extent than is lining 41, the latter being made of a single, circumferentially continuous section. However, it will be understood that the continuity or sectionalizing of either lining is not important to the broader aspects of the invention.

Lining 42 is illustrated as being wider than is lining 41, though it will be understood that this particular relationship is not limitative on the broader aspects of the invention. The linings may be of the same or different materials or the braking surfaces within the drums may be of different materials, as set forth in connection with Fig. 8 of the parent application. In other words, the coefficient of friction of one brake unit on one drum face may have the same value as or have a different value than the coefficient of friction of the other brake unit on its drum face.

Members A and B of set F are pivotally connected to supporting member 33 at 47 and 47a, respectively, whereas similar members A and B of set E are pivotally connected to member 33 at 47b and 47c, respectively (Fig. 4). The distal ends 48 of members A and B of set F carry opposed rollers 49, whereas the similar ends 48a of members A and B of set E carry opposed rollers 49a. Interposed between rollers 49 is a cam 50 carried on a tubular cam shaft 51 which has rotational bearing in the boss 52 of plate 33. Secured to shaft 51 is a crank arm 63.

A second cam shaft 51a, actuated by crank arm 64, has bearing within the bore of shaft 51 and carries a cam 50a which is interposed between rollers 49a of set E. Crank arms 63 and 64 have universal joint or other suitable connection at 65 and 66, respectively, with equalizer bar 67. The brake-applying rod 68, adapted to be actuated by any suitable mechanical or hydraulic mechanism (not shown) is applied to bar 67 at 69. It will be seen that a pull exerted on rod 68 will act through bar 67, crank arms 63, 64 and cam shafts 51 and 51a to cause simultaneous application of brake shoe sets E and F to their associated brake drum faces 31 and 32, respectively, for clockwise rotation of those shafts, as viewed in Fig. 1, acts through cams 50, 50a to spread the distal ends 48 and 48a of the members A and B, rocking said members about their pivots 47, 47a, 47b and 47c and simultaneously applying linings 41 and 42 to said braking surfaces.

The description and significance of the particular equilizing connection between rod 68 and crank arms 63, 64, will be treated later.

For purposes of easy reference, I will hereinafter consider flange 35 and lining 41 as making up a brake-shoe unit 53 cooperating with bell-drum 26, and flange 36 and lining 42 as making up a brake-shoe unit 54 cooperating with skirt-drum 27. It will be apparent that the total area of effective braking surface represented by the simultaneous application of units 53 and 54 is materially increased over that of a usual single unit (for instance, as represented by 54) to very obvious advantage.

In preparation for the analysis which is to follow, it is to be noted that the thrust exerted by cams 50, 50a on the distal ends of members A and B of sets E and F, is applied to rollers 49, 49a at points lying in median planes 58 and 57, respectively, which are normal to the braking surfaces 32 and 31.

When it is desired to release the brakes, cams 50, 50a are rotated, or allowed to rotate, in a counter-clockwise direction, as viewed in Fig. 1, spring 59 applied to studs 60 on members A and B of set F (and a similar spring, not shown, on members A and B of set E) retracting the distal ends of those members to disengage the several brake linings from their associated drum-surfaces.

For the purpose of discussing certain aspects of the theory of arrangement and operation, I will refer particularly to the schematic showing of Fig. 5, confining the discussion to members A of the sets E and F, since everything said of those members applies with equal force to members B.

In Fig. 5, the width of shoe 53 is represented by $Wb$, the total reaction pressure on that shoe is represented by $Pb$, and the line of thrust is represented by the line 57 which also represents the median plane of shoe 53. Similarly, the width of shoe 54 is represented by $Wa$, the total reaction pressure on that shoe is represented by $Pa$, and the line of thrust is represented by the line 58 which also represents the median plane of shoe 54. The width of the space, if any, between opposing edges of shoes 53 and 54 is represented by $S$.

Though not indicated in the drawings, $pb$ may be considered the unit area pressure on shoe 53, and $Ab$ the effective surface area of that shoe, the total pressure $Pb$ thus being the product of $pb$ and $Ab$. The effective angular extent of shoe 53 is taken as $\angle b$, while the coefficient of friction of the shoe 53 on drum 26 is taken as $Cb$. Similarly, $pa$ may be considered the unit area pressure on shoe 54, $Aa$ the effective surface area of that shoe, $\angle a$ the effective angular extent of shoe 54, and $Ca$ the coefficient of friction of the shoe 54 on drum 27. The unit area heat dissipating capacities of drums 26 and 27 will be represented by $rb$ and $ra$, respectively.

In Figs. 5 and 6, $x$ represents the distance from point 69 to point 65 (which is in the connection leading to the wider shoe 54) while $y$ represents the distance from point 69 to point 66 (which is in the connection to the narrower shoe 53). It will be seen that the proportionate values of $x$ and $y$ play an important part in the performance of the brake, for, assuming all other factors have given relative values, the final, desirable balanced effect may be secured by the compensating effect of an appropriate proportioning of the $x$ and $y$ values.

In order that the several shoes and drums may wear evenly, and give the best overall performance, including substantially equalized drum-expansion, it is important that certain heat balances be effected. Ideally, there must be an equilibrium established between generated heat and dissipated heat. We may approach the problem from two angles. Assume the drum structure be such that the ratio of unit area heat dissipation capacities of the drum zones 26 and 27 be known. Then the characteristics of the braking elements and applying mechanism ideally should be such that the unit area heat generating abilities of the two shoes be in that same ratio. Or, if the characteristics of the braking elements and the applying mechanism are first established to produce a given ratio of unit area heat generating abilities, the drum structure may then be designed to give the drum zones unit area heat dissipating abilities in substantially the same ratio.

Consider first a situation where the ratio of unit area heat dissipation capacities of the two drum zones 27 and 26 is 1:1. Then, with brake linings of given widths, angular extents and coefficients of friction on the given drum surfaces, we wish to determine what proportionate dimensions $x$ and $y$ will balance the unit area heat generating abilities of the two shoes 54 and 53.

It is provable that, to accomplish this condition of equilibrium, $x$ must be to $y$ as $(Wb)(\angle b)(Ca)$ is to $(Wa)(\angle a)(Cb)$. In other words, if the widths of the two shoes be equal and the angular extents of the shoes be equal, $x$ and $y$ should be directly proportional to the coefficients of friction of the two shoes. If the widths of the two shoes are equal and the coefficients of friction of the two shoes are equal, $x$ and $y$ should be inversely proportional to the angular extents of the two shoes. If the angular extents of the two shoes are equal and the coefficients of friction of the two shoes are equal, $x$ and $y$ should be inversely proportional to the widths of the two shoes.

By way of example, in the embodiment shown in Fig. 1, it may be assumed that the heat dissipation ratio is 1:1 and that the coefficients of friction of the two shoes on the given drum surfaces are equal. However, the ratio of the widths of shoes 54 and 53 is 6 to 4 and the ratio of angular extents of shoes 54 and 53 is 120 to 125.

Since the effective braking area of shoe 53 is less than that of shoe 54 and it is desirable that their unit area pressures be varied in order that the desired balance between heat generating and heat dissipating capacities may be secured and maintained, the point 69 at which rod 68 applies force to bar 67 is chosen to give the particular distribution of pressures to the shoes which will bring about the desired condition.

Then, by the formula, the values of $x$ and $y$ are made to be such that:

$x$ is to $y$ as $(Wb)(\angle b)$ is to $(Wa)(\angle a)$ or $$\frac{x}{y} = \frac{(4)(125)}{(6)(120)} = \frac{25}{36}. \text{ So } x:y::25:36$$

This gives $y$ a value of 1.44$x$, the effective distances from the line of pull of rod 68 to the lines of pull on the crank arm to the narrow shoe 53 and on the crank arm to the wide shoe 54 being inversely proportional to the widths of the respective shoes.

With the applying force so distributed, it is assured that the unit area of heat generating abilities of the two shoes are balanced, and, since it was assumed that the heat radiating or dissipating capacities of the two systems balance, there is the desired equilibrium between heat generation and dissipation in the combined systems.

If the shoe and applying system be first calculated to give balanced unit area heat generating abilities, the drum structure may be designed to have balanced unit area heat dissipating capacity to insure the maintenance of equalized unit area brake temperatures within allowable limits. This may be done by properly proportioning the thickness dimensions of the drum parts, or providing for proper air cooling circulation, or by providing cooling fins, or by utilizing combinations of such factors.

If we start with the premise that the unit area heat dissipating capacities of the two drums are in some given ratio other than one-to-one, we may proceed as follows. For instance, assume that the heat dissipating capacities of zones 27 and 26 are in the ratio of $ra$ to $rb$, and that this is other than a one-to-one ratio. Since the unit area heat generating abilities should vary directly as the dissipating values, we need merely introduce these values for heat dissipation in the general formula and then solve for $x$ and $y$, as above. The general formula, as so modified, becomes $$x:y::(rb)(Wb)(\angle b)(Ca):(ra)(Wa)(\angle a)(Cb)$$

This means that, all other factors being equal, $x$ and $y$ are made to be substantially inversely proportional to the heat dissipating capacities of the respective drum-zones.

It will thus be seen that no matter what the several factors may be (within reasonable limits) the proper shifting of the line of pull on rod 68 to vary the proportionate distances between it and the lines of pull on the unit actuating crank arms, enables one to secure the characteristics of unit heat generating ability which will bring about the best brake performance.

It will be understood that various changes in design, structure and arrangement may be made without departing from the spirit and scope of the appended claims.

I claim:

1. In combination, a supporting structure, a wheel mounted for rotation with respect to said structure, a deep belled drum centered on and secured to said wheel, said drum comprising a bell-portion and a skirt portion of larger diameter than the bell-portion, an internal brake-drum surface in the bell portion, a larger diameter internal brake-drum surface in the skirt portion, a carrier member mounted stationarily on the supporting structure, a pair of brake shoes movably carried by the carrier member and associated, one each, with said brake-drum surfaces, a brake operating member, and a differential force-applying connection between said operating member and both of said brake shoes whereby said shoes are applied simultaneously to their associated brake-drum surfaces but with differential mechanical advantage.

2. The combination of claim 1, wherein one shoe is wider than the other, and wherein the mechanical advantage is in favor of the wider shoe.

3. In combination, a supporting structure, a wheel mounted for rotation with respect to said structure, a deep belled drum centered on and secured to said wheel, said drum comprising a bell-portion and a skirt portion of larger diameter than the bell-portion, an internal brake-drum surface in the bell-portion, a larger diameter internal brake-drum surface in the skirt portion, a carrier member mounted stationarily on the supporting structure, a pair of brake shoes movably carried by the carrier member and associated, one each, with said brake-drum surfaces, individual means for operatively engaging said shoes with the associated brake-drum surfaces, individual rock shafts for operating said individual means, a pair of crank arms, one on each rock shaft, said arms being spaced apart, an equalizer bar connecting said arms, and a pull rod applied to said bar between its points of connection with the arms.

4. The combination of claim 3, wherein one shoe is wider than the other, and wherein the point of connection between the pull rod and the arm operating the rock shaft associated with the relatively narrow shoe is further from that arm than it is from the other arm.

5. The combination of claim 3, wherein one shoe is wider than the other, and wherein the widths of the spacings between the point of connection of the pull rod with the bar and the points of connection between the arms and bar are inversely proportional to the widths of the associated shoes.

References Cited in the file of this patent

UNITED STATES PATENTS

| | | |
|---|---|---|
| 1,457,681 | Whittingham | June 5, 1923 |
| 1,870,605 | Conlon et al. | Aug. 9, 1932 |
| 1,874,180 | Garrett | Aug. 30, 1932 |
| 2,645,311 | Farkas | July 13, 1953 |
| 2,682,319 | Bennett | June 29, 1954 |

FOREIGN PATENTS

| | | |
|---|---|---|
| 230,388 | Germany | Jan. 25, 1911 |